United States Patent [19]

Hamada et al.

[11] Patent Number: 4,998,211
[45] Date of Patent: Mar. 5, 1991

[54] METHOD OF AND APPARATUS FOR GENERATING A FILLED PATTERN DEFINED BY CONTOUR VECTORS

[75] Inventors: Hiroshi Hamada, Hinode; Ichiro Okui, Kokubunji, both of Japan

[73] Assignee: Kabushiki Kaisha Toshiba, Kawasaki, Japan

[21] Appl. No.: 295,709

[22] Filed: Jan. 11, 1989

[30] Foreign Application Priority Data

Jan. 14, 1988 [JP] Japan .................... 63-6039

[51] Int. Cl.$^5$ ................... G06F 15/62; G09G 5/36
[52] U.S. Cl. ............................ 364/518; 340/747; 340/744
[58] Field of Search .............. 364/518, 523, 521; 340/747, 744, 735, 730

[56] References Cited

U.S. PATENT DOCUMENTS

| | | | |
|---|---|---|---|
| 4,199,815 | 4/1980 | Kyte et al. | 364/523 |
| 4,626,838 | 12/1986 | Tsujioka et al. | 340/744 |
| 4,745,575 | 5/1988 | Hawes | 364/900 |
| 4,757,470 | 7/1988 | Bruce et al. | 364/900 |
| 4,791,582 | 12/1988 | Ueda et al. | 364/522 |
| 4,817,172 | 3/1989 | Cho | 382/21 |
| 4,849,907 | 7/1989 | Aotsu et al. | 364/518 |
| 4,914,729 | 4/1990 | Omori et al. | 340/703 |

FOREIGN PATENT DOCUMENTS 53-15624 12/1974 Japan.
53-41017 2/1975 Japan.

OTHER PUBLICATIONS

English Translation of Japanese Patent Disclosure No. 53-15624.
English Translation of Japanese Patent Disclosure No. 53-41017.
D. P. Paris, "Generating Matrix Patterns," IBM Technical Disclosure Bulletin, vol. 13, No. 9, Feb. 1971, pp. 2752-2754.
D. Berger et al., "Alteration of Digitized Image," IBM Technical Disclosure Bulletin, vol. 14, No. 4, Sep. 1971, pp. 1229-1230.

Primary Examiner—Dale M. Shaw
Assistant Examiner—Raymond J. Bayerl
Attorney, Agent, or Firm—Finnegan, Henderson, Farabow, Garrett, and Dunner

[57] ABSTRACT

An apparatus for generating a pattern defined by at least one group of vectors, includes a direction determining section for determining directions of current and previous vectors of each group of vectors, the end dot of the previous vector being the start dot of the current vector, a dot color determining section for determining dot color data of the start dot of the current vector in accordance with the direction of the current and previous vectors determined by said direction determining means, and a vector developing section for plotting the start dot of the current vector on a coordinate system in accordance with the dot color data.

17 Claims, 9 Drawing Sheets

| 34-1 VP / VC | → | ↗ | ↑ | ↖ | ← | ↙ | ↓ | ↘ |
|---|---|---|---|---|---|---|---|---|
| → | 1 | 1 | 0 | 0 | 0 | 0 | 1 | 1 |
| ↗ | 1 | 1 | 0 | 0 | 0 | 0 | 1 | 1 |
| ↑ | 1 | 1 | 0 | 0 | 0 | 0 | 1 | 1 |
| ↖ | 0 | 0 | 1 | 1 | 1 | 1 | 0 | 0 |
| ← | 0 | 0 | 1 | 1 | 1 | 1 | 0 | 0 |
| ↙ | 0 | 0 | 1 | 1 | 1 | 1 | 0 | 0 |
| ↓ | 0 | 0 | 1 | 1 | 1 | 1 | 0 | 0 |
| ↘ | 1 | 1 | 0 | 0 | 0 | 0 | 1 | 1 |

| | |
|---|---|
| NUMBER OF CONTOURS (CCD) | 2 |
| NUMBER OF VECTORS (VCD) | 4 |
| START COORDINATES OF 1st VECTOR | (6,1) |
| END COORDINATES OF 1st VECTOR | (1,7) |
| END COORDINATES OF 2nd VECTOR | (13,7) |
| END COORDINATES OF 3rd VECTOR | (13,1) |
| END COORDINATES OF 4th VECTOR | (6,1) |
| NUMBER OF VECTORS (VCD) | 4 |
| START COORDINATES OF 1st VECTOR | (5,3) |

METHOD OF AND APPARATUS FOR GENERATING A FILLED PATTERN DEFINED BY CONTOUR VECTORS

BACKGROUND OF THE INVENTION

1. Field of the Invention

The present invention relates to a method of and apparatus for generating a pattern defined by a plurality of vectors, e.g., a vector font pattern, by developing the vectors, filling an area defined by the developed vectors, and drawing a contour thereof.

2. Description of the Related Art

According to a known conventional character pattern generating apparatus, a character pattern is generated by drawing the contour of a character pattern or a vector font defined by a plurality of vectors and filling the area defined by the contour. In an apparatus of this type, filling has been performed by the following scheme. The entire contour of a given character is drawn. The drawn pattern is then scanned in a predetermined direction, and all the dots from a first black dot to a next black dot are converted into black dots, thereby filling the area defined by the contour.

Figure 1A:
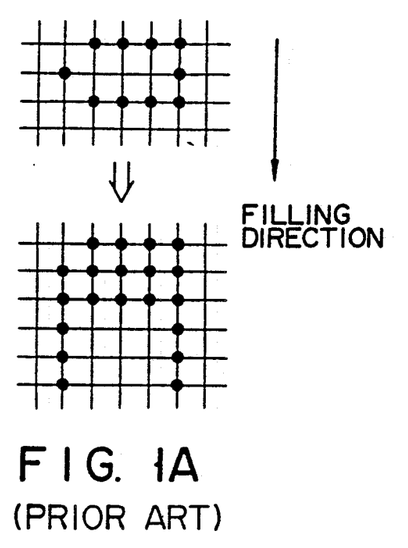
FIGS. 1A and 1B are views for explaining an operation of a conventional vector font pattern generating apparatus.
Figure 1B:
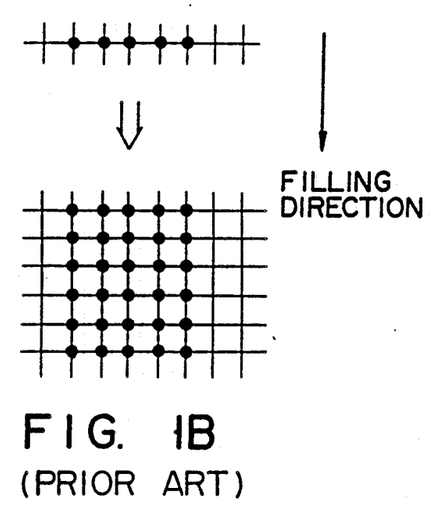

In this scheme, however, if a tip of a character pattern present in a filling direction is one dot (to be defined as a one-dot tip), not only this one-dot tip but also a dot train therefrom are undesirably filled, as shown in FIG. 1A. In order to eliminate such inconvenience, the character pattern must be designed so as not to generate such a one-dot tip (a tip of the character pattern present as one dot in a direction perpendicular to the filling direction is not called a one-dot tip), and hence a cumbersome operation is required. Since the number of vectors is increased in accordance with the number of portions from which one-dot tips are eliminated, the generation speed of a character pattern is decreased. In addition, the above-described inconvenience is caused when odd-numbered intermediate dots (neither start dot nor end dot of filling) are present on the contour of the character pattern in a filling direction as shown in FIG. 1A. Moreover, as shown in FIG. 1B, if one-line data is present in a direction perpendicular to the filling direction, dot trains from the dot line are undesirably filled.

SUMMARY OF THE INVENTION

The present invention has been made in consideration of the above situation, and has as its object to provide a method of and apparatus for generating a pattern, in which whether the start dot of a current vector is a one-dot tip and whether a developed dot is an intermediate dot can be efficiently detected in vector development processing, and if a one-dot or an intermediate dot is detected, a corresponding dot is not written with a dot color representing a contour, thereby preventing generation of an erroneous character pattern in filling.

In order to achieve the above object, an apparatus for generating a pattern defined by a plurality of vectors comprises a direction determining section for determining directions of previous and current vectors of the plurality of vectors, an end dot of the previous vector being a start dot of the current vector, a start dot color determining section for determining dot color data of the start dot of the current vector in accordance with the directions of the current and previous vectors determined by the direction determining section, and a vector developing section for plotting the start dot of the current vector in accordance with the dot color data determined by the start dot color determining section.

In order to achieve the above object, a method of generating a pattern defined by a plurality of vectors, comprises the steps of determining directions of previous and current vectors of the plurality of vectors defining each contour, an end dot of the previous vector being a start dot of the current vector, determining dot color data of the start dot of the current vector in accordance with the determined directions of the current and previous vectors, and OR-writing the start dot in accordance with the determined dot color data.

As described above in detail, according to the present invention, whether the start dot of a current vector is a one-dot tip or not is determined on the basis of the directions of the current and previous vectors of a plurality of vectors defining the contour of a pattern. A dot color of the start dot of the current vector is determined in accordance with this determination result. Therefore, even if a one-dot tip is present in a filling direction, no error occurs in filling. This one-dot tip can be automatically eliminated in vector development. In addition, no consideration for preventing generation of a pattern having a one-dot tip is required. Since vectors defining a pattern having a one-dot tip can be used, the number of vectors to be used can be decreased, thus increasing a speed of pattern generation.

Since discrimination of intermediate dots can be easily performed at a high speed, and no vector is developed with respect to an intermediate dot in the filling direction, generation of an erroneous pattern depending on the number of intermediate dots can be prevented in painting.

Since determination of a one-dot tip and an intermediate dot can be easily and quickly performed, a speed of pattern generation can be increased.

Moreover, since an exclusive OR operation is performed in filling, even one-line pattern in a direction perpendicular to the filling direction can be accurately filled.

DETAILED DESCRIPTION OF THE PREFERRED EMBODIMENTS

A vector font pattern generating apparatus according to the present invention will be described in detail below with reference to the accompanying drawings.

An arrangement of the vector font pattern generating apparatus according to an embodiment will be described first with reference to FIG. 2.

Figure 2:
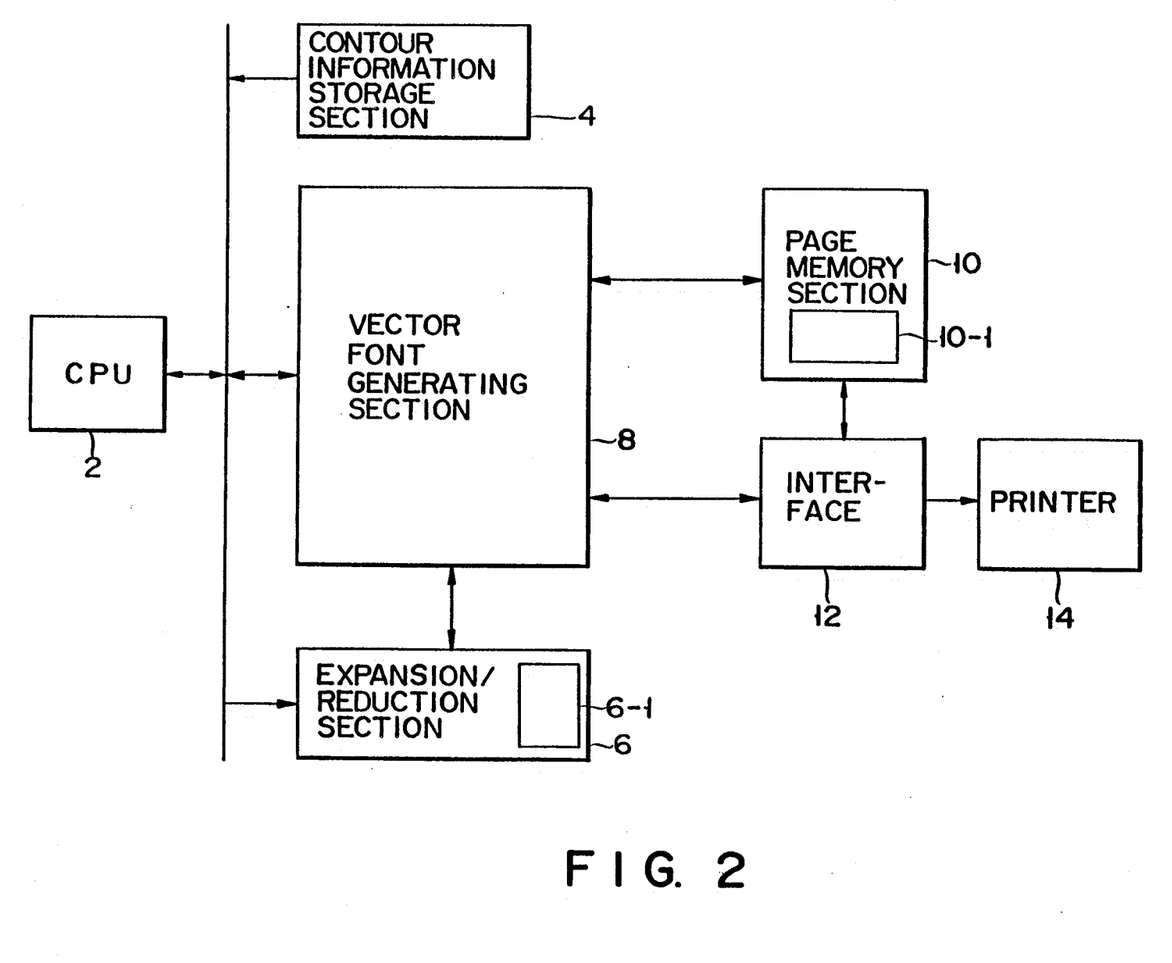
FIG. 2 is a block diagram showing an arrangement of a vector font pattern generating apparatus according to an embodiment of the present invention.
Figure 7:
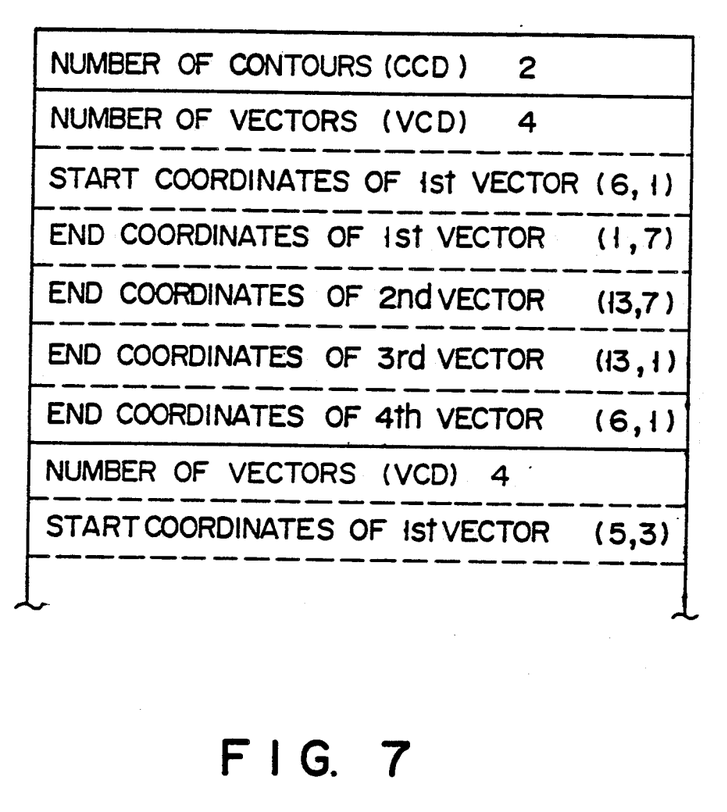
FIG. 7 is a format of contour information.

Referring to FIG. 2, in response to an input vector font generating instruction, CPU 2 generates a contour information output command, an expansion/reduction command, a development start command, a filling start command, and a drawing start command. Contour information storage section 4 stores contour information necessary for the generation of a font pattern. In this embodiment, the contour information is constituted by a contour count area, a first contour definition area, a second contour definition area, and the like, as shown in FIG. 7. The number of contours of a font to be generated is stored in the contour count area. The first contour definition area is constituted by a vector count area in which the number of vectors defining a first contour is in written and a vector definition area in which coordinates for defining these vectors are written. The first area, i.e., the vector count data area of the vector definition area is used to store the start coordinates of the first vector of these vectors. Areas after this area are used to store the end coordinates of these vectors. Of a plurality of vectors defining a single contour, the end coordinates of the first vector become the start coordinates of a second vector, and the end coordinates of the second vector become the start coordinates of a third vector. Similarly, the end coordinates of the last vector become the start coordinates of the first vector. That is, a contour is always a closed curve.

In response to the contour information output command from CPU 2, contour information storage section 4 outputs contour information to expansion/reduction section 6. In response to the expansion/reduction command from CPU 2, expansion/reduction section 6 converts coordinate values of vectors written in the contour information from contour information storage section 4 and stores them in memory 6-1. Vector font generating section 8 reads out the contour information from memory 6-1 in response to the development start command from CPU 2 and develops dots representing the vectors in work area 10-1 of page memory section 10 in accordance with the readout information. Section 8 also fills dots in an area defined by a developed contour in response to the filling start command. Further, section 8 reads out the contour information from memory 6-1 in response to the drawing start command, and draws the contour in work area 10-1, thereby generating a vector font pattern. Page memory section 10 includes a page area for storing fonts corresponding to one page and work area 10-1 which is used for generating a vector font pattern. Page memory section 10 receives byte data and a memory address of work area 10-1 from section 8, and OR-writes the byte data in the memory address. Also, section 10 reads out byte data associated with a memory address from section 8 and supplies to section 8, in a filling mode. In response to the command from section 8, the pattern generated in work area 10-1 is transferred to the page area. Interface 12 reads out and outputs to printer 14 the vector font prepared in the page area of page memory section 10 in response to the command from section 8, and printer 14 prints the vector font.

Figure 3:
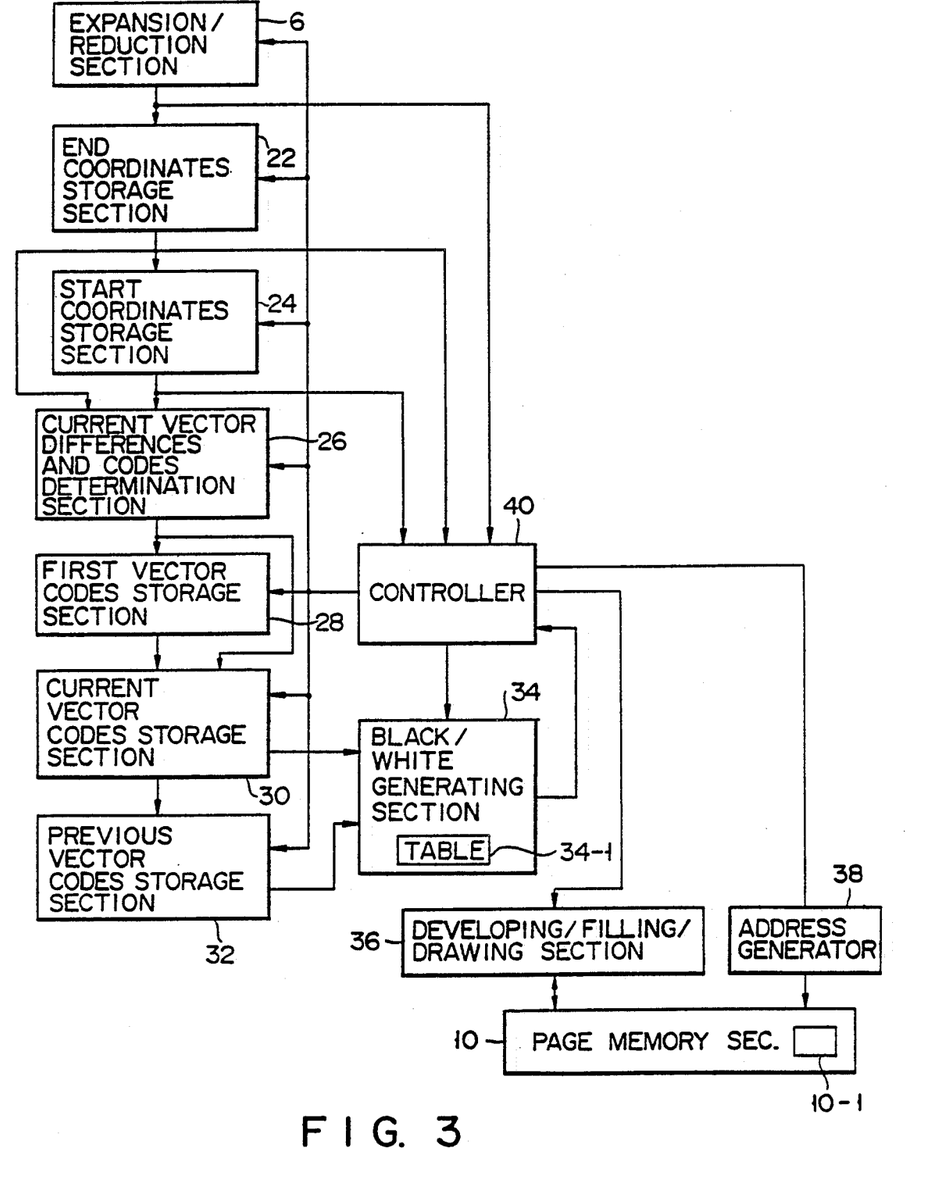
FIG. 3 is a block diagram showing an arrangement of a vector font generating section in the pattern generating apparatus.
Figure 4:
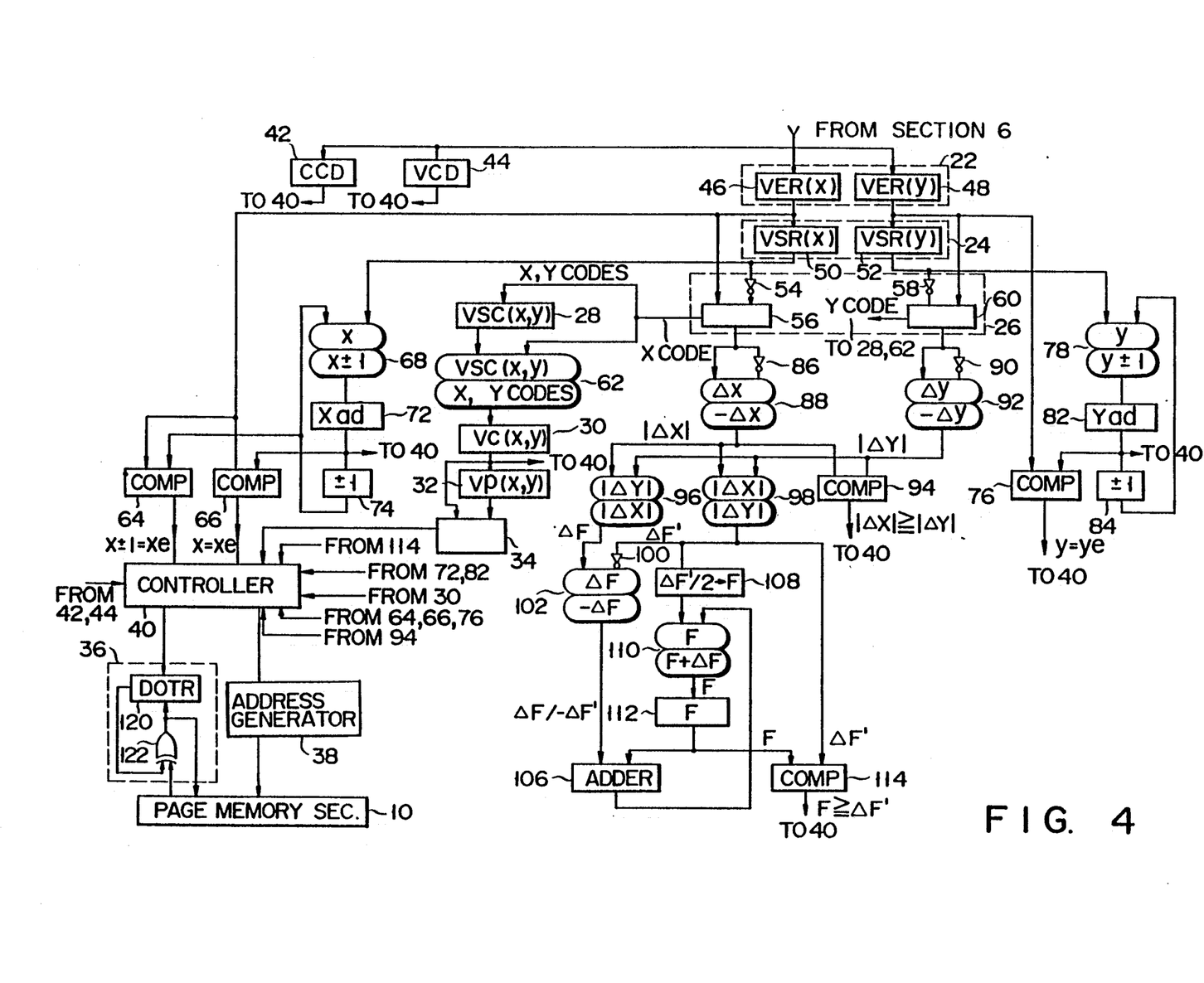
FIG. 4 is a block diagram showing a detailed arrangement of the vector font generating section.

An arrangement of vector font generating section 8 will be described in detail below with reference to FIGS. 3 and 4.

Of contour information outputs from expansion/reduction section 6, contour count data CCD is latched by counter 42 in response to a latch command from controller 40, and is decremented one by one in response to a contour count decrement command. Vector count data VCD written in the vector count data area of the first vector definition area is latched by counter 44 in response to a latch command from controller 40, and is decremented one by one in response to a vector count decrement command.

After end coordinate data VER (x,y) stored in end coordinates storage section 22 is transferred to start coordinates storage section 24 as start coordinate data VSR (x,y), end coordinate data VER (x,y) of a current vector to be currently processed, which is written in the vector definition area, is stored in end coordinates storage section 22. End coordinates storage section 22 includes registers 46 and 48 for respectively storing the x- and y-coordinates of the end dot (end x- and y-coordinates) VER (x,y) of the current vector. Start coordinates storage section 24 includes registers 50 and 52 for respectively storing the x- and y-coordinates of start dot (start x- and y-coordinates) VSR (x,y) of the current vector, i.e., the x- and y-coordinates of the end dot of a vector preceding the current vector.

Current vector differences and codes determination section 26 comprises x difference and code determination circuit 56 and y difference and code determination circuit 60. End x-coordinate data VER (x) stored in storage section 22 is directly supplied to determination circuit 56, whereas start x-coordinate data VSR (x) stored in storage section 24 is supplied thereto through negative sign arithmetic operation circuit 54. In determination circuit 56, VER (x)-VSR (x) is calculated, and difference $\Delta x$ and the x code representing its sign are determined on the basis of the calculation result. Similarly, end y-coordinate data VER (y) stored in storage section 22 is directly supplied to y difference and code determination circuit 60, whereas start y-coordinate data VSR (y) stored in storage section 24 is supplied to determination circuit 60 through negative sign arithmetic operation circuit 58. In determination circuit 60, VER (y)-VSR (y) is calculated, and difference $\Delta y$ and the y code representing a sign thereof are determined on the basis of the calculation result. Each of the x and y codes represents any one of signs +, 0, and −. That is, a current vector direction is determined from eight digitized directions by the x and y codes, except that x code=0 and y code=0.

The x and y codes determined for the current vector, i.e., current vector code VC (x,y), are supplied to selector 62. Current vector code VC (x,y) when a current vector is a first vector is stored as first vector code VSC (x,y) in register 28 serving as the first vector codes storage section in response to a command from controller 40. First vector code VSC (x,y) is also supplied from storage section 28 to selector 62. Current vector code VC (x,y) supplied to selector 62 is normally supplied to register 30 serving as a current vector codes storage section 30 in response to a selection control command from controller 40. Current vector code VC (x,y) stored in register 30 is supplied to controller 40 so as to determine that either an operation of a "+1" or of "−1" addition should be performed by adders 74 or 84. In response to a transfer command from controller 40, current vector code VC (x,y) is stored in register 30 after the x and y codes of a vector preceding the current vector, i.e., previous vector code VP (x,y) is stored in register 32 serving as a previous vector codes storage section.

Current vector code VC (x,y) and previous vector code VP (x,y) stored in registers 30 and 32 are supplied to black/white generating section 34. As a result, the dot color of the start dot of the current vector is determined in accordance with color determination table 34-1 shown in FIG. 8.

Figure 8:
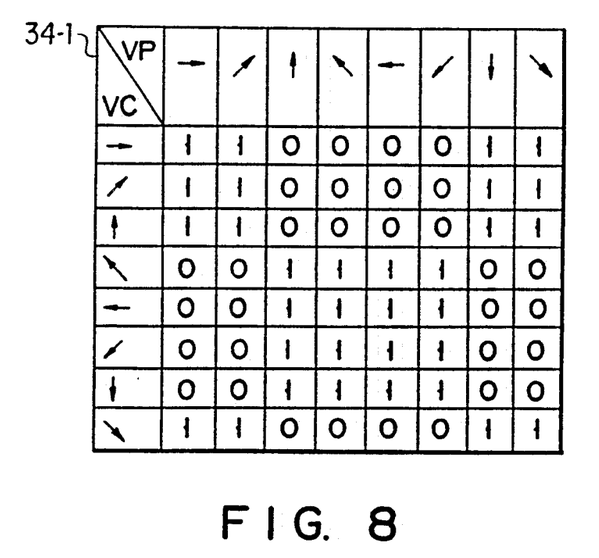
FIG. 8 is a color determination table.
Figure 9:
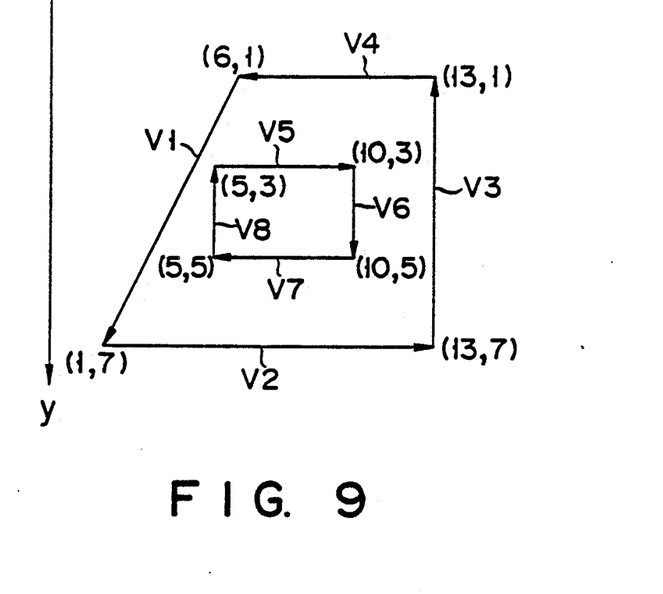
FIG. 9 is a view showing vectors written in the contour information.

As is apparent from FIG. 8, according to a white/black dot determination algorithm in this embodiment, if both previous vector x code VPx and current vector x code VCx are + (positive) or − (negative), i.e., current and previous vectors are directed in the same direction in relation to the X-axis, a black dot is generated. If current vector code VC (x,y) is (+, *) or (0, −) when the previous vector code VP (x,y) is (0,+), a black dot is generated. Symbol * indicates any one of signs +,0, and −. If current vector code Vc (x,y) is (−,*) or (0,+) when the previous vector code VP (x,y) is (0,−), a black dot is generated. If current vector x code VCx is 0 and current vector y code VCy is + (positive) (down) when previous vector x code VPx is − (negative), a black dot is generated. If current vector x code VCx is 0 and current vector y code VCy is − (negative) (up) when previous vector x code VFx is + (positive), a black dot is generated.

In contrast to this, if one of previous vector x code VPx and current vector x code VCx is + (positive) and the other is − (negative), i.e., if current and previous vectors are directed in the opposite directions in relation to the X-axis, when only one dot is to be developed in a filling direction (y direction), the start dot of the current vector is regarded as a one-dot tip, and a white dot is generated.

Even if current and previous vectors are directed in the opposite directions relative to the X-axis, however, when a plurality of dots are to be generated on the same x-coordinate in the filling direction (y direction), each of the dots is not regarded as a one-dot tip.

Note that white/black dot generating section 34 can be realized as software or as hardware by using a table memory such as a ROM in which a white or black dot is stored at each address designated by linked data of four signs, i.e., previous vector x code VPx, current vector x code VCx, previous vector y code VPy, and current vector y code VCy.

End x-coordinate VER (x) from register 46 is supplied to comparators 64 and 66. Start x-coordinate VSR (x) from register 50 is supplied to selector 68. Addition result Xad±1 from adder 74 is supplied to the other input terminal of selector 68. In response to a selection control command from controller 40, selector 68 outputs one of start x-coordinate VSR (x) and addition result Xad±1 to register 72 as x address Xad. In order to determine whether development of the current vector is completed, x address Xad latched by register 72 and addition result Xad±1 from adder 74 are respectively supplied to comparators 66 and 64. Outputs from comparators 64 and 66 are supplied to controller 40. In a vector developing mode for developing vectors, if either of the outputs from comparators 64 and 66 is true, it is determined that the development of the current vector is completed.

End y-coordinate VER (y) from register 48 is supplied to comparator 76. Start y-coordinate VSR (y) from register 52 is supplied to selector 78. Addition result Yad±1 from adder 84 is supplied to the other input terminal of selector 78. In response to a selection control command from controller 40, selector 78 outputs one of start y-coordinate VSR (y) and addition result Yad±1 to register 82 as y address Yad. In order to determine whether drawing of the current vector is completed, y address Yad latched by register 82 and end y-coordinate VER (y) are respectively supplied to comparator 76. Outputs from comparators 66 and 76 are supplied to controller 40. In a contour drawing mode for drawing a contour, if both the outputs from comparators 66 and 76 are true, it is determined that a contour drawing operation of the current vector is completed.

Difference $\Delta x$ determined by determination circuit 56 is supplied to selector 88 directly or through negative sign arithmetic circuit 86. Similarly, difference $\Delta y$ determined by determination circuit 60 is supplied to selector 92 directly or through negative sign arithmetic circuit 90. In response to an absolute value selection control command, which is determined on the basis of current vector code VC (x,y), from controller 40, selectors 88 and 92 select absolute values $|\Delta x|$ and $|\Delta y|$. The absolute value selection control command may be determined by controller 40 on the basis of differences $\Delta x$ and $\Delta y$ from circuits 56 and 60. Absolute values $|\Delta x|$ and $|\Delta y|$ are supplied to comparator 94 so as to determine whether absolute value $|\Delta x|$ is larger than absolute value $|\Delta y|$. The comparison result is output to controller 40.

Absolute values $|\Delta x|$ and $|\Delta y|$ are supplied to selectors 96 and 98, and are selected as values $\Delta F$ and $\Delta F'$ in response to a selection control command from controller 40, which is determined by the comparison result from comparator 94. When absolute value $|\Delta x|$ is larger than absolute value $|\Delta y|$, selector 96 selects absolute value $|\Delta y|$, whereas selector 98 selects absolute value $|\Delta x|$. If absolute value $|\Delta y|$ is larger than the other absolute value, selector 96 selects absolute value $|\Delta x|$, whereas selector 98 selects absolute value $|\Delta y|$. Value $\Delta F$ from selector 96 is supplied to selector 102. Selector 102 also receives from selector 98 value $-\Delta F'$ which has been changed into a negative value by negative sign arithmetic circuit 100. In response to a selection control command from controller 40, selector 102 outputs one of values $\Delta F$ and $-\Delta F'$.

Value $\Delta F$ from selector 98 is also supplied to divider 108 and comparator 114. Divider 108 calculates value $\Delta F'/2$, and outputs it to selector 110 as value F. Value F latched by register 112 is also supplied to adder 106. Addition result $F+\Delta F$ or $F-\Delta F'$ obtained by adder 106 is output to selector 110 as value $F+\Delta F$. In response to a selection control command from controller 40, selector 110 outputs one of values F and $F+\Delta F$ to register 112 as value F. Value F is output to adder 106 and comparator 114. Comparator 114 determines whether value F is larger than value $\Delta F'$, and signals a comparison result to controller 40. If value F is larger than value $\Delta F'$, the coordinate corresponding to a smaller one of absolute values $|\Delta x|$ and $|\Delta y|$ is updated. If not, the coordinate of the smaller absolute value is not updated.

Addresses Xad and Yad from registers 72 and 82 are supplied to controller 40. Controller 40 sets dots which should be developed or drawn in accordance with addresses Xad and Yad, i.e., write bit data, in register (DOTR) 120. In addition, controller 40 causes address generator 38 to generate a memory address in accordance with addresses Xad and Yad. In the vector developing and contour drawing modes, the write bit data set in DOTR 120 is OR-written at the memory address in work area 10-1. In a filling mode, the generated address is used to read associated one-byte data from work area 10-1. The read byte data is supplied to one input terminal of exclusive OR gate 122. The bit data latched by DOTR 120 is supplied to the other input terminal of gate 122. An exclusive OR operation result from gate 122 is OR-written at the memory address in work area 10-1 again, and at the same time is latched by DOTR 120 for the next byte data.

An operation of the vector font pattern generating apparatus according to the present invention will be described below with reference to FIGS. 5 and 6.

In response to an input vector font generation instruction, CPU 2 respectively outputs a contour information output command, an expansion/reduction command, and a development start command to contour information storage section 4, expansion/reduction section 6, and vector font generating section 8. In response to the contour information output command, storage section 4 outputs contour information to section 6. In response to the expansion/reduction command from CPU 2, section 6 converts coordinates of vectors written in the contour information from storage section 4, and stored the resultant data in memory 6-1. The stored contour information is sequentially output to generating section 8, thereby performing vector development, filling, and contour drawing.

Vector development is executed in response to the development start command first. In step S2, contour count data CCD of the contour information read out from expansion/reduction section 6 is latched by counter 42 in response to a latch command from controller 40. As is apparent from the contour information shown in FIG. 7, a vector font to be generated has two contours. In step S4, controller 40 checks whether data CCD is 0. If Y in step S4, vector development is completed. If N in step S4, step S6 is executed.

In step S6, vector count data VCD written in the first vector count area of the contour information is latched by counter 44 in response to a latch command from controller 40, and flag VSCENB is set to logic "0". The number of vectors used to write the first contour is four. In step S8, vector coordinates (6,1) written in the first vector definition area are stored in end coordinates storage section 22 as end coordinate data VER (x,y). In step S10, end coordinate data VER (6,1) stored in storage section 22 is transferred to start coordinates storage section 24 as start coordinate data VSR (6,1) in response to a transfer command from controller 40. Subsequently, end coordinate data VER (1,7) of the first vector written in the vector definition area is stored in storage section 22. In step S12, vector count data VCD is decremented by one.

In step S14, determination circuits 56 and 60 calculate $\Delta x = VER (1) - VSR (6) = -5$ and $\Delta y = VER (7) - VSR (1) = 6$, respectively, on the basis of end coordinate data VER (1,7) stored in storage section 22 and start coordinate data VSR (6,1) stored in storage section 24, thereby determining differences $\Delta x$ and $\Delta y$. Each of the x and y codes represents a positive, 0, or negative sign. That is, a current vector direction is determined from eight digitized directions by the x and y codes. In the case, the x and y codes are respectively determined to be negative and positive in accordance with differences $\Delta x$ and $\Delta y$. In step S16, it is determined whether both the x and y codes are "0". If Y in step S16, step S28 is executed. If N in step S16, step S18 is executed. In step S18, it is determined whether flag VSCENB is set to logic "1". Flag VSCENB of "1" means that a current vector is not the first vector. In the example, current vector is the first vector and flag VSCENB is set to logic "1", and step S20 is executed. As a result, the x and y codes are stored in first vector codes storage section 28.

The determined x and y codes are also supplied to selector 62 as first vector code VSC (x,y) in step S22. In addition, selector 62 selects the first vector code and stores it in current vector codes storage section 30 in response to a selection control command from controller 40. Coordinates VSR (x) and VSC (y) stored in start coordinates storage section 24 are respectively supplied to registers 72 and 82 through selectors 68 and 78 as addresses Xad and Yad. These coordinates are used to generate addresses when dots representing the current vector are developed in work area 10-1 of page memory section 10.

Figure 10A:
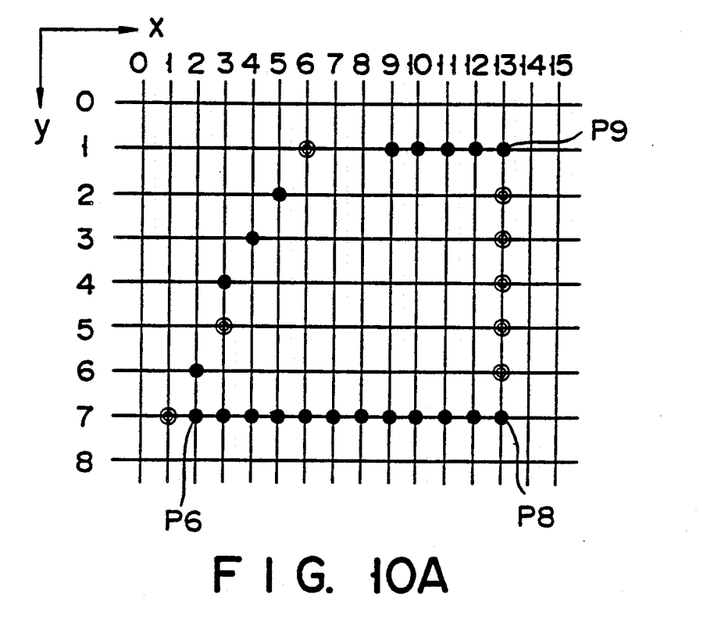
FIGS. 10A to 10C are views for explaining vector development, filling, and contour drawing.

In step S24, vector development is executed. As a result, dots representing the first vector are developed in work area 10-1, as shown in FIG. 10A. This processing will be described in detail later. When development for the first vector is completed, current vector code VC (x,y) is transferred to storage section 32 as previous vector code VP (x,y) in step S26. Subsequently, it is determined in step S28 whether vector count data VCD is "0". If N in step S28, the flow returns to step S10, so that processing for developing the second vector in work area 10-1 is executed. In this embodiment, when development for the first to fourth vectors is completed in this manner, Y is determined in step S28, and step S30 is executed.

It is determined in step S30 whether the current mode is the contour drawing mode. If Y in step S30, step S38 is executed. If N in step S30, step S32 is executed. In the example, vector developing mode is currently set, so N is determined in step S30 and, hence, step S32 is executed. In step S32, controller 40 checks whether flag VSCENB is set to logic "1". In this embodiment, since the number of vectors is four and flag VSCENB has been set to "1" in step S24, Y is determined in step S32. Therefore, step S34 is executed, and first vector code VSC (x,y) stored in storage section 28 is stored in storage section 30 as current vector code VC (x,y). The color of the end dot of the fourth vector, i.e., of the start dot of the first vector, is determined on the basis of codes VC (x,y) and VP [x,y] stored in storage sections 30 and 32 by referring to color determination table 34-1. When the dot color is determined, data associated with the dot color is set in register 120. The set data is OR-written in work area 10-1 of page memory section 10.

Subsequently, in step S40, contour count data CCD is decremented by one, and controller 40 checks in step S42 whether data CCD is "0". If Y in step S42, the vector development processing is ended, and CPU 2 is informed of that fact. If N in step S42, step S6 is executed again, so that the same processing as described above is executed for the second contour.

Vector development will be described in detail below with reference to FIG. 6.

Figure 5:
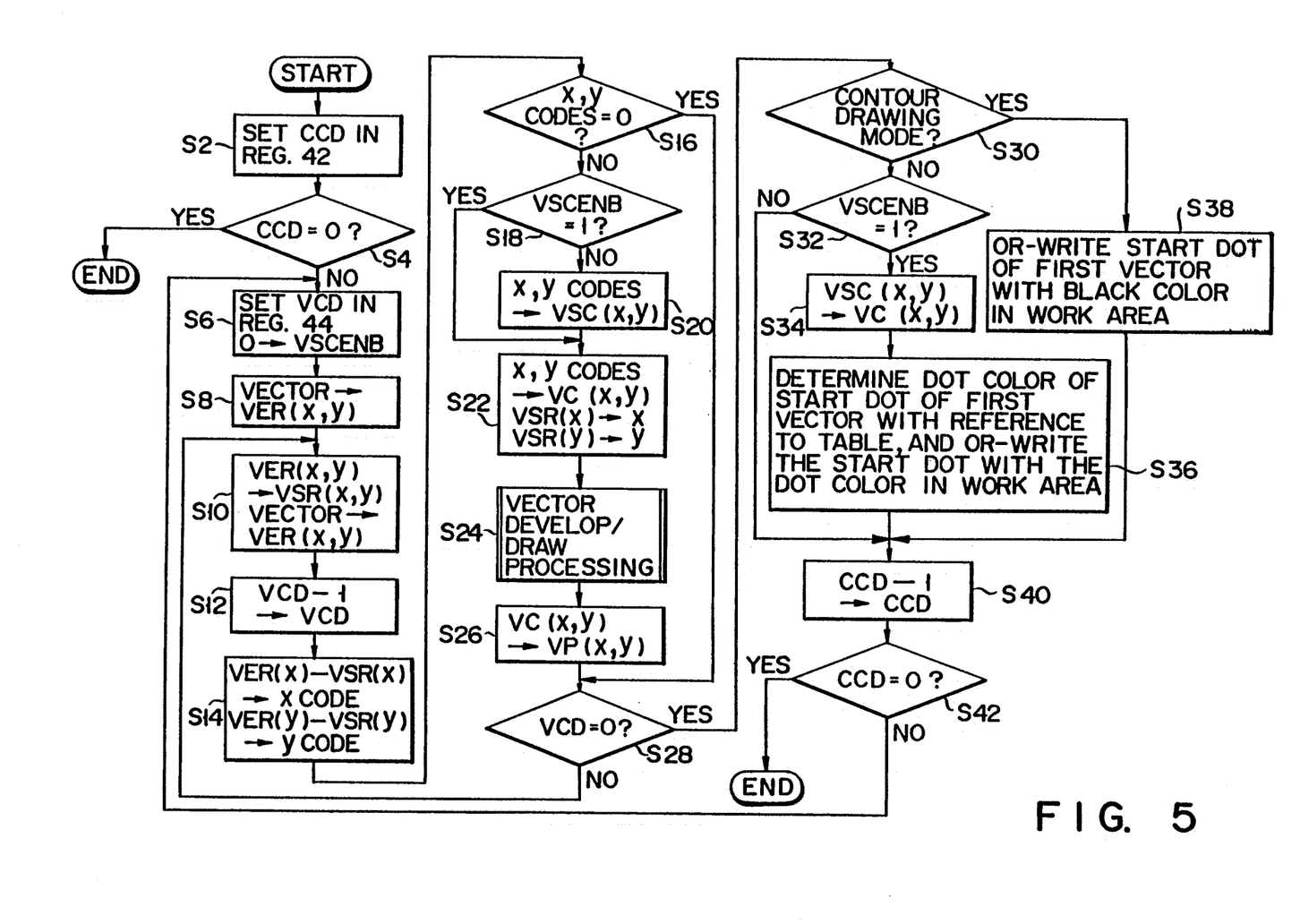
FIG. 5 is a flow chart for explaining an operation of the vector font pattern generating apparatus according to the embodiment of the present invention.
Figure 6:
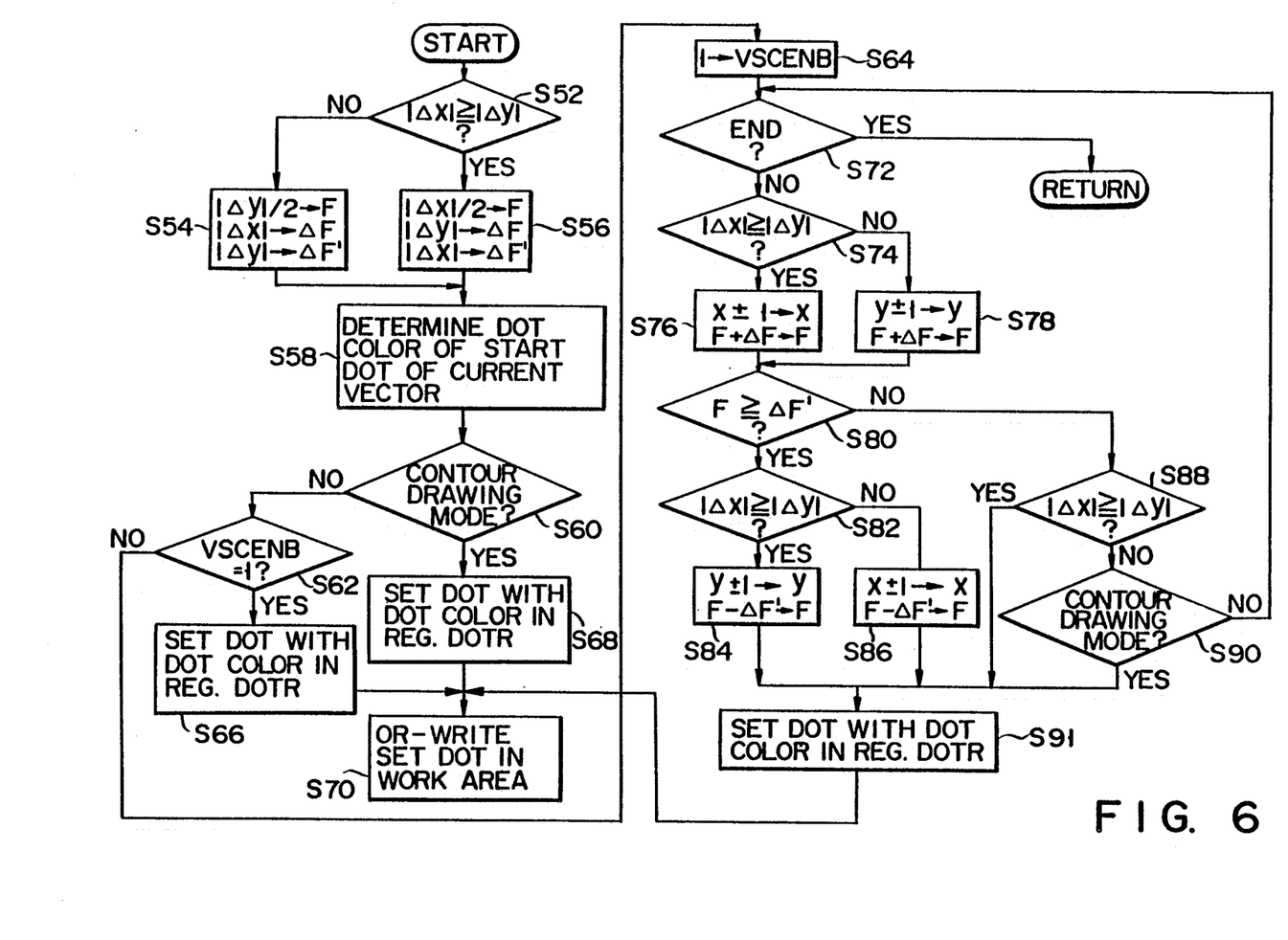
FIG. 6 is a flow chart for explaining an operation of vector development/contour drawing of the pattern generating apparatus.

Differences $\Delta x$ and $\Delta y$ determined in step S14 of FIG. 5 are respectively supplied to selectors 88 and 92 directly or through negative sign arithmetic circuits 86 and 90. Controller 40 generates an absolute value selection control command based on current vector code VC (x,y). In response to the absolute value selection control command, selectors 88 and 92 select absolute values | Δx | and | Δy |. Absolute values | Δx | and | Δy | are supplied to comparator 94, and are compared in step S52. That is, the gradients of the vectors are determined by comparator 94. Since, in the example, the first vector has start coordinates (6,1) and end coordinates (1,7), values Δx and Δy are −5 and 6, respectively. Therefore, absolute values | Δx | and | Δy | are 5 and 6, respectively. When absolute value | Δx | is larger than or equal to the absolute value | Δy |, step S56 is executed. Otherwise, step S54 is executed. In this case, step S54 is executed, and selectors 96 and 98 respectively select absolute values | Δx | and | Δy |. Divider 108 calculates | Δy |/2=3 and obtains value F as the calculation result. Absolute value | Δx | is directly supplied to selector 102, whereas absolute value | Δy | is supplied thereto through negative sign arithmetic circuit 100. In selector 102, absolute values | Δx | and | Δy | respectively set as values ΔF and −ΔF. In addition, start x-coordinate 6 and start y-coordinate 1 of the first vector are respectively held in registers 72 and 82 through selectors 68 and 78 as addresses Xad and Yad.

In step S58, controller 40 determines in accordance with current vector codes VC (x,y) that either a "+1" or "−1" addition should be performed by adders 74 and 84. In addition, the dot color of the start dot of the current vector is determined on the basis of current vector code VC (x,y) and previous vector code VP (x,y) by referring to color determination table 34-1. In step S60, controller 40 determine whether the current mode is the contour drawing mode. In the example, vector developing mode is currently set, so N is determined in step S60, and step S62 is executed. In step S62, controller 40 determines whether flag FSCENB is set to logic "1". Since flag VSCENB has been set to logic "0" in step S6, N is determined in step S62. Subsequently, in step S64, flag VSCENB is set to logic "1". As described above, a black dot is not written at the start coordinates of the first vector, as shown in FIG. 10A. In step S72, controller 40 determines whether the processing is ended. N is determined in step S72 on the basis of outputs from comparators 64 and 66. That is, if either of the outputs from comparators 64 and 66 is true in the vector developing mode, controller 40 determines that vector development of the current vector is completed. In the contour drawing mode, however, if both the outputs from comparators 66 and 76 are true, controller 40 determines that contour drawing of the current vector is completed. Upon completion of the processing, the flow returns to step S26 in FIG. 5.

In step S74, controller 40 determines whether absolute value | Δx | is larger than or equal to absolute value | Δy |. In this case, N is determined in step S74. As a result, address Yad is incremented by one by adder 84 in step 378. Therefore, addresses Xad and Yad are 6 and 2, respectively. In addition, adder 106 adds value ΔF to value F, so that value F is "8". In step S80, comparator 114 compares addition result F with value ΔF' (=6) to determine whether value F is larger than or equal to value F'. If Y in step S80, step S82 is executed to determine whether absolute value | Δx | is larger than or equal to absolute value | Δy |. If N in step S82, step S86 is executed. If Y in step S82, step S84 is executed. Since N is determined in step S82 in this case, step S86 is executed, so that address Xad is decremented by one by adder 74 and is "5". In addition, value ΔF' is selected by selector 102 and is added to value F by adder 106, so that value F is "2". In step S91, data "1" is written at a fifth bit position in register 120, which is designated by addresses Xad and Yad held in registers 72 and 82. Thereafter, in step S70, a memory address is generated by address generator 38 by using addresses Xad and Yad. Byte data is OR-written at the accessed memory address in work area 10-1, as shown in FIG. 10A.

Similarly, black dots are written at coordinates (4,3) and (3,4), as show in FIG. 10A. When the black dot is written at coordinate (3,4), value F is "0". In step S78, address Yad is decremented by one, and value ΔF is added to value F so as set value F to "5" in the same manner as described above. Since value ΔF is "6", N is determined in step S80. Subsequently, in step S88, controller 40 determines whether absolute value | Δx | is larger than or equal to absolute value | Δy |. If N in step S88, step S90 is executed. If Y in step S88, step S91 is executed. Since N is determined in step S88 in this case, step S90 is executed to determine whether the contour drawing mode is currently set. Since the vector developing mode is currently set, N is determined in step S90, and step S72 is executed again. With this operation, a blank dot is not written at coordinate (3,5) as an intermediate dot.

Similar to coordinates (5,2), (4,3), and (3,4), a black dot is written at coordinates (2,6). In this case, since address Xad is "2" and an output from adder 74 is "1", Y is determined from an output of comparator 64 in step S72. As a result, vector development of the current vector is completed.

Vector development of the second vector is performed from step S10 to step S22. A development/drawing routine is executed in step S24. Since the end coordinates are (13,7) and the start coordinates are (2,7), differences Δx and Δy determined in step S14 of FIG. 5 are "11" and "0", respectively, and Y is determined in step S52. Therefore, divider 108 calculates | Δx |/2=5.5, and the calculation result is set to be value F. Absolute value | Δx | is directly supplied to selector 102, whereas absolute value | Δy | is supplied thereto through circuit 100. In selector 102, absolute value | Δy | is set to be value ΔF, and a value | Δx | is set to be value −ΔF. In addition, start x-coordinate "1" and start y-coordinate "7" of the first vector are respectively held in registers 72 and 82 through selectors 68 and 78.

In step S58, the dot color of the start coordinates (1,7) of the second vector is determined. In this case, the x and y codes of the previous vector are negative and positive, respectively, whereas the x and y codes of the current vector are positive and "0", respectively. Therefore, the dot color of coordinates (1,7) is determined to be white by referring to color determination table 34-1 in FIG. 8. That is, this operation is equivalent to an operation of writing no dot. As for coordinates (2,7) of the second vector, Y is determined in step S74, so that address Xad held in register 72 is incremented by one in step S76 and becomes 2. Since absolute value | Δx | is larger than absolute value | Δy |, and value ΔF is "0", N is determined in step S80, and Y is determined in step S88. As a result, a black dot is written at coordinates (2,7) in steps S91 and S70. Subsequently, as shown in FIG. 10A, black dots are written at coordinates from (3,7) to (12,7) in the same manner as described above.

When a black dot is written at coordinates (12,7), vector development of the second vector is completed.

Similar to the first and second vectors, vector development of the third and fourth vectors is then executed. In vector development of the third vector, coordinates from (13,6) to (13,2) as intermediate dots are not processed after coordinates (13,7) is processed in step S52 to S64 since Y is determined from outputs of comparators 64 and 66 in step S72. Vector development of the fourth vector is the same as that of the second vector. When a black dot is written at coordinates (7,1), the vector development of the fourth vector is completed. Thereafter, a black dot is written at coordinates (6,1) in steps S30 to step S36. That is, a dot color is determined from color determination table 34-1 by respectively setting the current and previous vectors to be the first and fourth vectors, thereby writing a black dot.

Figure 10B:
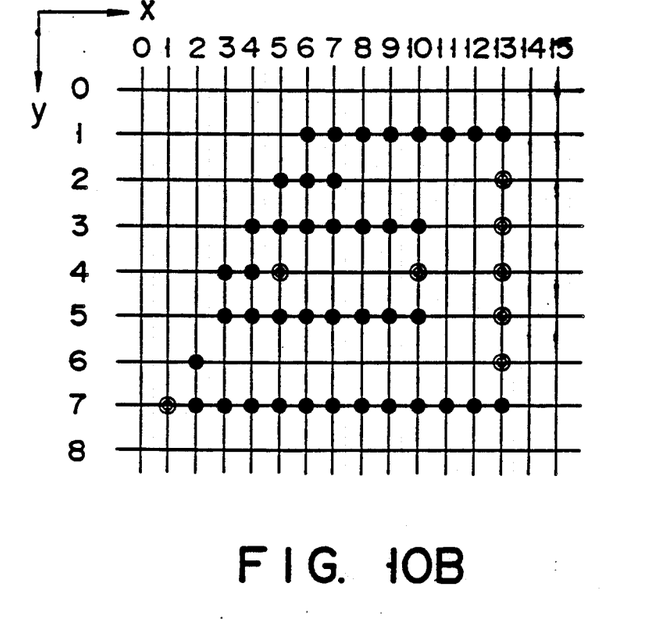
Figure 10C:
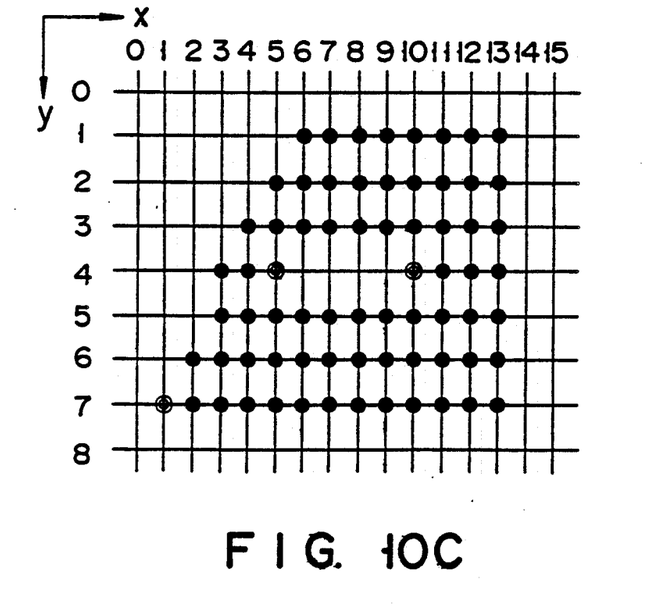

When the vector development of the first and second contours is completed, filling is performed in response to a filling start command from CPU 2. FIG. 10B shows a state of the processing. In response to a command from controller 40, address generator 38 sequentially generates memory addresses, and reads out byte data. The readout byte data is supplied to exclusive OR gate 122, and an exclusive OR operation is executed therein. For example, byte data readout from address Yad=0 and address Xad=0 to 7 is "0000 0000", and byte data read from work area 10-1, i.e., byte data obtained by vector development in address Yad=1 and address Xad=0 to 7, is "0000 0011". When these byte data are exclusively ORed, the result is "0000 0011". This data is held in register 120, and is OR-written in work area 10-1. Byte data obtained by vector developed in address Yad=2 and address Xad=0 to 7 is "0000 0100", and byte data "0000 0111" is generated from byte data "000 0011". This data is held in register 120 and is OR-written in work area 10-1. Byte data read out from work area 10-1, i.e., byte data obtained by vector development in address Yad=3 and address Xad=0 to 7, is "0000 1111". When these byte data are exclusively ORed, the result is "0000 1000". This data is OR-written in work area 10-1. The operation result is held in register 120 and is used for an arithmetic operation of the next byte data. The next byte data obtained by vector development in address Yad=4 and address Xad=0 to 7 is "0001 0000". The operation result is "0001 1000". In addition, byte data obtained by vector development in address Yad=5 and address Xad=0 to 7 is "0000 0111". The operation result is "0001 1111". In this manner, filling is performed. Note that a point having coordinates (1,7) is not filled with a black dot in the filling mode.

When the filling is completed, contour drawing is started in response to a drawing start command from CPU 2. The procedures of this processing are substantially the same as those of the vector development. Therefore, only different points will be described.

The flow of contour drawing is different from that of the vector development shown in FIG. 5 in that Y is determined in step S30 and step S38 is executed. In step S38, the start dot of the first vector is unconditionally written with a black dot.

In the flow shown in FIG. 6, differences between the contour drawing and the vector development will be described below.

In step S58, a dot color of a start dot is always determined to be black. Therefore, color determination table 34-1 is not referred to even for the start dot. Y is determined in step S60, a black dot is set in register 120 for the start dot of the current vector, and is OR-written in work area 10-1 in step S70. Therefore, color determination table 34-1 is not referred to even for the start dot.

In step S90, Y is determined. Subsequently, steps S91 and S70 are executed, so that a black dot is written at a bit position in work area 10-1, which is designated by addresses Xad and Yad.

In the above-described embodiment, filling is performed in the y direction. However, it is apparent that the present invention can be applied to a case wherein the filling is performed in the x direction.

According to the linear drawing algorithm shown in the embodiment from steps S74 to S91, even if current and previous vectors are directed in the opposite directions in relation to the x direction, a start dot of the current vector is not treated as a one-dot tip when the end dot of the previous vector (the start dot of the current vector) has the same x-coordinate as that of a dot before the end dot. However, if round-off processing is performed in the linear drawing algorithm in order to determine an x-coordinate, a one-dot tip appears whenever current and previous vectors are directed in the opposite directions in relation to the X-axis, and hence a black color dot is not drawn. In this case, the system may be designed such that a black dot is not generated when the filling direction is set to be the y direction, and no change occurs in x-coordinate value between the current and previous dots. With this arrangement, the present invention can be directly applied to the above case.

What is claimed is:

1. An apparatus for generating a pattern defined by at least one group of contour data, each group representing a segment of the contour of the pattern, each contour data having a start dot and an end dot, comprising:

memory means for storing dots representing the pattern;

direction determining means, responsive to an input development start command, for determining directions of successive previous and current contour data for each group of contour data, wherein an end dot of previous contour data is a start dot of the current contour data;

dot color determining means for determining a dot color of the start dot of the successive current contour data, each start dot being called a designated dot, in accordance with the directions of said each current and previous contour data determined by said direction determining means;

contour data developing means for developing the designated dots of the successive current contour data in said memory means in accordance with the determined dot color; and filling means responsive to an input filling start command, for reading out current data in an area defined by the developed dots from said memory means in a filling direction, performing an exclusive OR operation of the current data with previous data, OR-writing the operation result in said memory means, and holding the operation result as the previous data.

2. An apparatus according to claim 1, further comprising:

contour information storage means for storing contour information which includes coordinate data for each group of contour data, contour count data, and count data for each group of contour data; and expansion/reduction means for converting the coordinate data in accordance with an input expansion/reduction command, and outputting the contour information including the converted coordinate data to said direction determining means.

3. An apparatus according to claim 21, wherein said data color determining means further comprises means for determining the dot color of a current dot that is not a start or end dot, the current dot being called a designated dot, in accordance with coordinates of the current dot and a dot previous to the current dot, the current dot being designated as the previous dot after the determination of the dot color of the current dot.

4. An apparatus according to claim 1, further comprising contour drawing means for drawing a contour of the pattern defined by each group of contour data in accordance with a predetermined dot color in response to an input drawing start command.

5. An apparatus according to claim 1, wherein said direction determining means includes:
holding means for holding previous x and y codes of the previous contour data;
code generating means for generating current x and y codes of the current contour data in accordance with differences between the x- and y-coordinates of the start dot and an end dot of the current contour data; and
means for transferring the current x and y codes to said holding means as the previous x and y codes when the dot color of the start dot is determined, and
wherein said dot color determining means includes:
detecting means for detecting whether coordinates of the start dot of the current contour data are different from coordinates of a dot previous to the end dot of the previous contour data with respect to a direction perpendicular to a filling direction; and
means for determining the dot color of the start dot in accordance with the previous x and y codes, and the current x and y codes, and a detection result by said detecting means.

6. An apparatus according to claim 1, wherein said direction determining means includes:
holding means for holding previous x and y codes of the previous contour data;
code generating means for generating current x and y codes of the current contour data in accordance with differences between the x- and y-coordinates of the start dot and an end dot of the current contour data; and
means for transferring the current x and y codes to said holding means as the previous x and y codes when the dot color of the start dot is determined, and
wherein said dot determining means includes means for determining the dot color of the start dot in accordance with the current x and y codes and previous x and y codes.

7. A method of generating a pattern defined by at least one group of contour data, each group representing a segment of the contour of the pattern, each contour data having a start dot and an end dot, comprising the steps of:
determining a dot color of a current dot, called an object dot, in accordance with coordinates of the current dot and a dot previous to the current dot, the determining step not being performed on a start dot and an end dot of a current contour data;
developing a dot image pattern on a coordinate system in accordance with the determined dot color;
determining directions of a previous contour data and the current contour data of each group of contour data, an end dot of the previous contour data being the start dot of the current contour data; and
determining the dot color of the start dot of the current contour data, called an object dot, in accordance with the determined directions of the current and previous contour data; and
reading out current data of the coordinate system in a filling direction, performing an exclusive OR operation of the current data with previous data, OR-writing the operation result on the coordinate system, and holding the operation result as the previous data.

8. A method according to claim 7, wherein contour information includes coordinate data defining each group of contour data, contour count data, and contour data count data of each contour, the coordinate data being converted in accordance with magnification data.

9. A method according to claim 7, further comprising the step of drawing dots defined by each group of contour data on the coordinate system in accordance with a predetermined dot color.

10. A method according to claim 7, wherein the step of determining the directions includes:
holding previous x and y codes of the previous contour data;
generating current x and y codes in accordance with differences between the x- and y-coordinates of the start and end dots of the current contour data; and
transferring the current x and y codes as the previous x and y codes when the dot color of the start dot is determined, and
wherein the step of determining the color includes:
detecting that coordinates of the start dot of the current contour data are different from coordinates of a dot previous to the end dot of the previous contour data; and
determining the dot color of the start dot in accordance with the previous x and y codes, the current x and y codes, and the detection result.

11. A method according to claim 7, wherein the step of determining the directions includes:
holding previous x and y codes of the previous contour data;
generating current x and y codes of the current contour data in accordance with differences between the x- and y-coordinates of the start and end dots; and
transferring the current x and y codes as the previous x and y codes when the dot color of the start dot is determined, and
wherein the step of determining the dot color includes determining the dot color of the start dot in accordance with the previous x and y codes and the current x and y codes.

12. A character pattern generating apparatus for developing a plurality of segments defining a character pattern and filling an area defined by the segments, comprising:
difference and sign determining means for sequentially determining differences between start and end dots of each of the plurality of segments on an x and y axes of two-dimensional coordinate system, and signs representing the differences;
first sign storage means for storing the signs of a first segment of the plurality of segments from said difference and sign determining means;

second sign storage means for storing the signs of a current segment of the plurality of segments from said difference and sign determining means; and the first segment signs stored in said first sign storage means being made to be the current segment signs when the start dot of the first segment is to be written;

third sign storage means for storing as the signs of a previous segment the current segment signs from said second sign storage means;

determining means for checking in accordance with the current segment signs and the previous segment signs whether or not the start dot of the current segment as an object dot is a one-dot tip, and determining dot colors of the start dot in accordance with the checking result; and plotting means for plotting the object dot with the determined dot colors on the two-dimensional coordinate system in accordance with a predetermined plotting algorithm.

13. An apparatus according to claim 12, wherein said determining means includes means for determining the dot color of the last dot of the current segment as the dot color of the start dot of a segment next to the current segment.

14. An apparatus according to claim 12, wherein said determining means includes means for determining that the start dot of the current segment as the object dot is the one-dot tip when one of signs of direction perpendicular to the filling direction, of the current and previous segment signs is positive and the other is negative.

15. An apparatus according to claim 12, wherein said determining means comprises means for reading out the first segment signs from said first sign storage means as the current segment signs to determine the dot color of the start dot of the first segment, when the dot colors of the dots of a last segment except for the end dot is determined.

16. An apparatus according to claim 12, wherein said determining means further comprises;

intermediate dot determining means for checking in accordance with coordinates of as the object dot one of dots of the current segment except for the end dot and a dot previous to the object dot whether or not the object dot is an intermediate dot in a filling direction.

17. An apparatus according to claim 16, wherein said intermediate dot determining means includes means for determining that the object dot of the current vector is the intermediate dot when a coordinate of the object dot in the direction perpendicular to the filling direction is the same as that of the previous dot.

* * * * *